US012623504B2

(12) United States Patent
Nordell

(10) Patent No.: US 12,623,504 B2
(45) Date of Patent: May 12, 2026

(54) ASSEMBLY COMPRISING STUD MEMBER WITH ANTI-SLIPPING FEATURE

(71) Applicant: Volvo Car Corporation, Gothenburg (SE)

(72) Inventor: Magnus Nordell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 19/059,531

(22) Filed: Feb. 21, 2025

(65) Prior Publication Data

US 2025/0276550 A1 Sep. 4, 2025

(30) Foreign Application Priority Data

Mar. 1, 2024 (EP) ..................................... 24160875

(51) Int. Cl.
*B60G 7/00* (2006.01)

(52) U.S. Cl.
CPC ............. *B60G 7/008* (2013.01); *B60G 7/005* (2013.01); *B60G 2204/148* (2013.01); *B60G 2204/416* (2013.01); *B60G 2206/7102* (2013.01); *B60G 2206/72* (2013.01); *B60G 2206/82* (2013.01)

(58) Field of Classification Search
CPC .. B60G 7/008; B60G 7/005; B60G 2204/148; B60G 2204/416
See application file for complete search history.

(56) References Cited

U.S. PATENT DOCUMENTS

2003/0049071 A1\* 3/2003 Ohmura .............. F16C 11/0619
403/122
2014/0091542 A1\* 4/2014 Luttinen .............. B60G 17/015
280/86.75
2016/0355066 A1\* 12/2016 Wilcutt ..................... B23P 6/00

FOREIGN PATENT DOCUMENTS

GB 2343666 A \* 5/2000 ............. B60G 7/005
JP 2004286161 A \* 10/2004 .......... F16C 11/0604

OTHER PUBLICATIONS

JP-2004286161-A Machine English translation (Year: 2004).\*
Jul. 1, 18, 2024 European Search Report issued in corresponding EP Application No. 24160875.

\* cited by examiner

*Primary Examiner* — Jason D Shanske
*Assistant Examiner* — Matthew James O'Neill
(74) *Attorney, Agent, or Firm* — Clements Bernard Walker; Christopher L. Bernard

(57) ABSTRACT

An assembly for supporting pulling forces of a suspension member of a vehicle comprises a stud member comprising a shaft portion having one or more ribs extending in a radial direction on an outer wall of the shaft portion, a clamping member comprising a main body with a bore defined by an inside wall and arranged to receive the shaft portion, and a fastening member arranged to fasten the clamping member around the shaft portion when the shaft portion is inside the bore, wherein the main body of the clamping member is made of a first material, and the shaft portion of the stud member is made of a second material, and wherein the first material is softer than the second material.

13 Claims, 7 Drawing Sheets

Fig. 1D-I     Fig. 1D-II     Fig. 1D-III

Fig. 1E-I
Fig. 1E-II
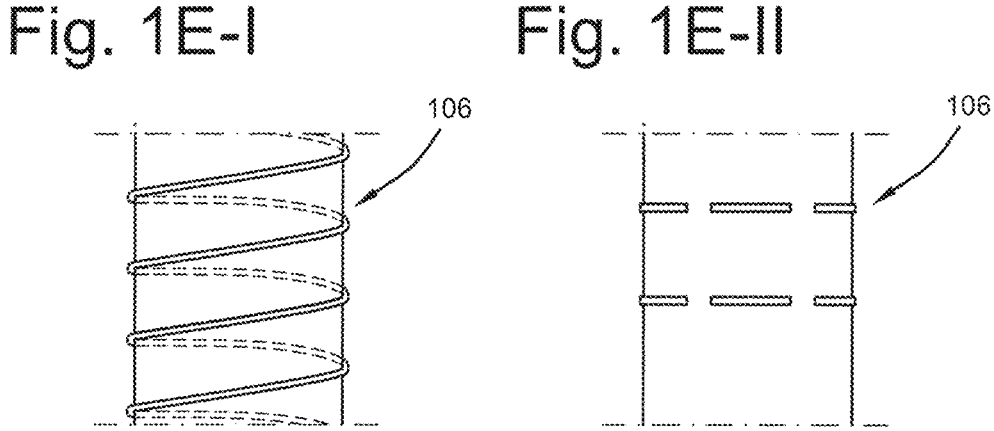
Fig. 2A
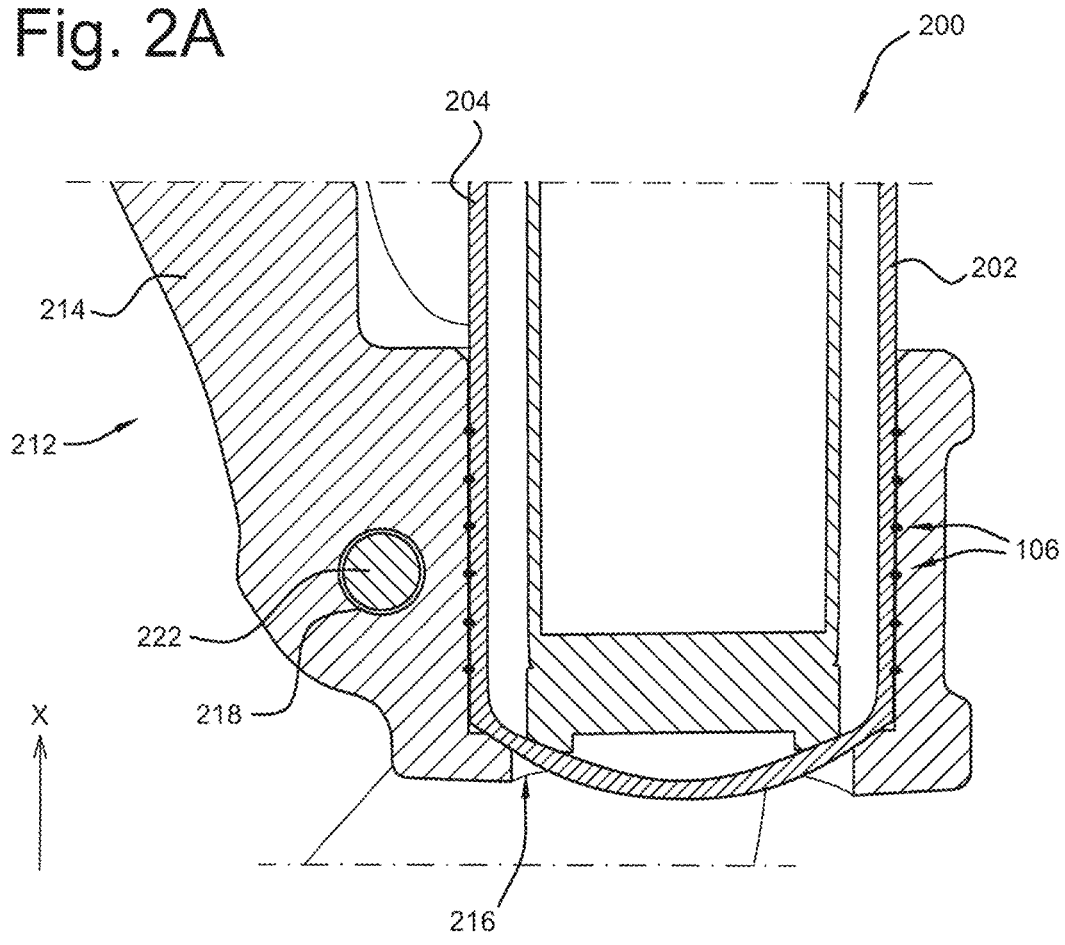

Fig. 3B-I
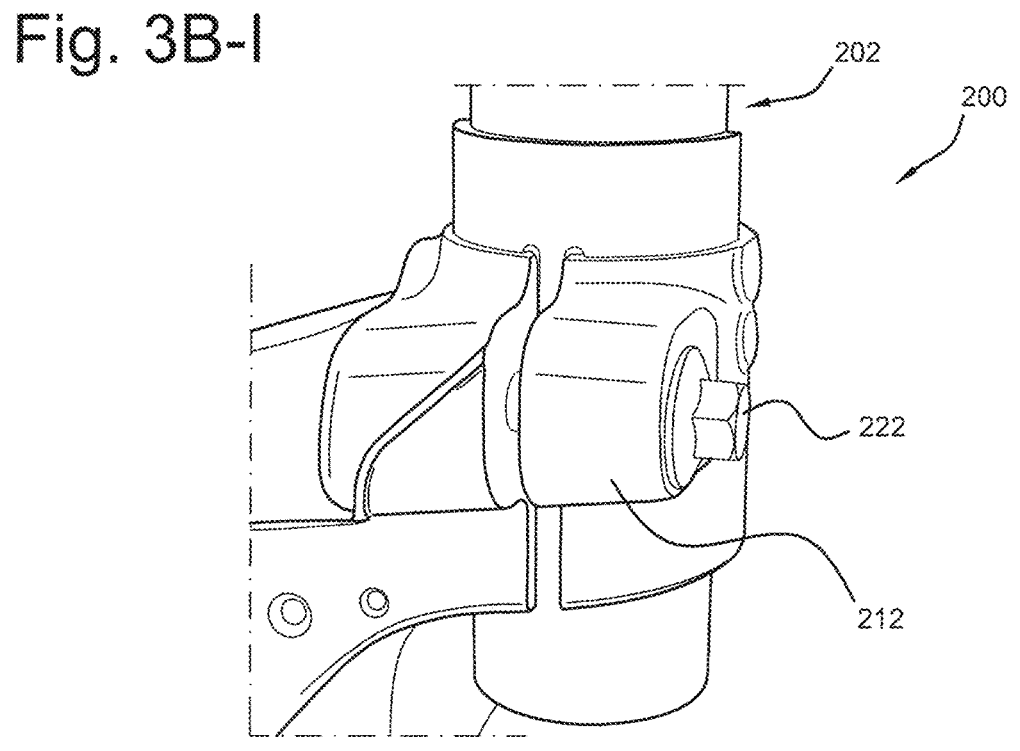
Fig. 3B-II
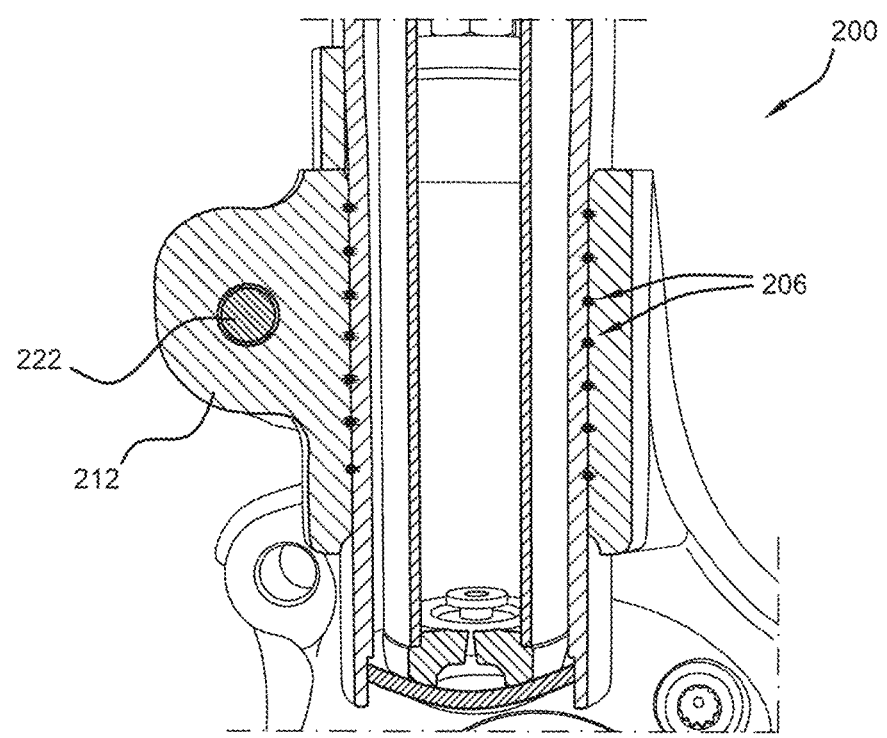

Fig. 3C-I
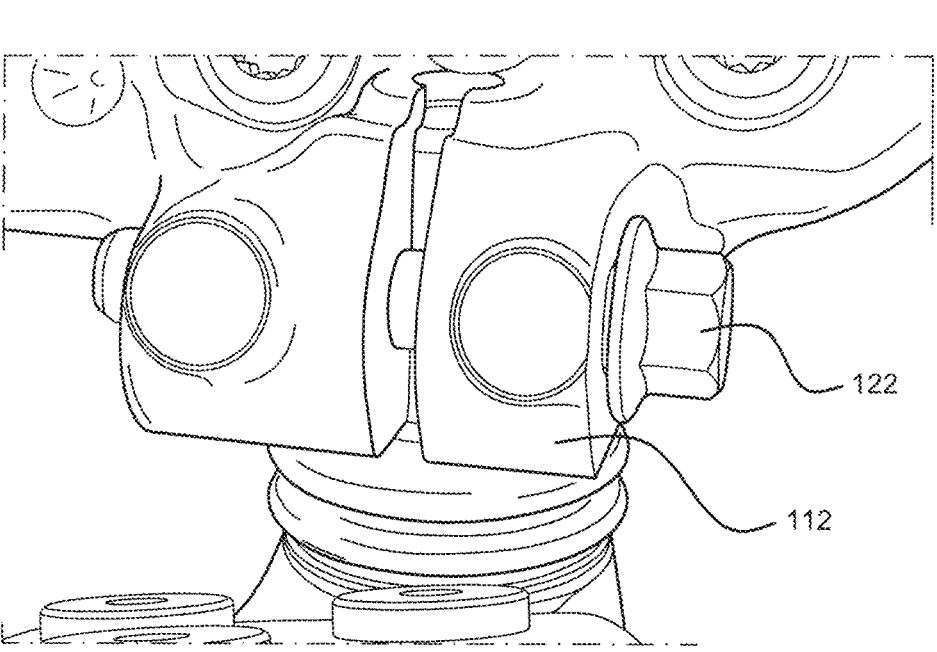
Fig. 3C-II
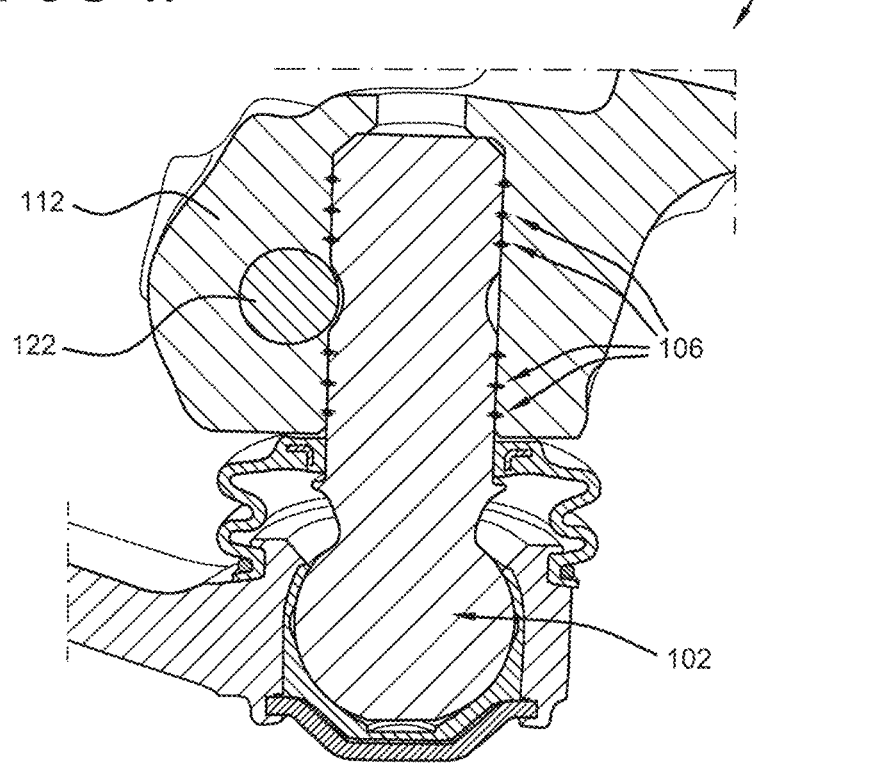

ASSEMBLY COMPRISING STUD MEMBER WITH ANTI-SLIPPING FEATURE

CROSS-REFERENCE TO RELATED APPLICATION

The present disclosure claims the benefit of priority of co-pending European Patent Application No. 24160875.1, filed on Mar. 1, 2024, the contents of which are incorporated in full by reference.

TECHNICAL FIELD

The present disclosure relates to the fastener field, in particular studs used in conjunction with clamping members for supporting pulling forces.

BACKGROUND

Current axial loaded studs depend on friction between the stud and the knuckle when clamped. If the stud and knuckle are not well clamped, the connection between them risks ending up with play, thereby causing noise in the vehicle.

To overcome the low friction normally found in these kind of assemblies, large screws are used to secure a safe attachment of the stud and the knuckle. This helps to withstand pulling forces and prevent the stud from slipping. However, larger screws increase costs and weight of an assembly.

SUMMARY

According to an embodiment, an assembly for supporting pulling forces of a suspension member of a vehicle comprises a stud member comprising a shaft portion having one or more ribs extending in a radial direction on an outer wall of the shaft portion, a clamping member comprising a main body with a bore defined by an inside wall and arranged to receive the shaft portion, and a fastening member arranged to fasten the clamping member around the shaft portion when the shaft portion is inside the bore, wherein the main body of the clamping member is made of a first material, and the shaft portion of the stud member is made of a second material, and wherein the first material is softer than the second material.

Providing a stud member with one or more ribs extending in a radial direction results in a better gripping between the stud member and the clamping member, which is less dependent on friction. The one or more ribs extending radially on the outer of the shaft creates friction or clamping forces between the shaft and the clamping member. This helps to protect the assembly from pulling forces which can help to minimize or prevent slippage. Also, the risk of grease stuck on the shaft, that potentially reducing the friction, is decreased.

This also allows an assembly to reduce the size of fastening parts such screws due to the reduced pulling forces acting on the stud member. Reducing screw size can be done without sacrificing clamping force because, as compared to a conventional stud, the one or more ribs generates a larger clamping force. This may allow to reduce cost, materials and weight of an assembly.

The radial direction may form an angle between 90 and 45 degrees with an axial direction of the shaft portion and, when the clamping member is fastened around the shaft portion, the one or more ribs may deform an inside wall of the clamping member to increase grip. This may increase the gripping between both parts.

The one or more ribs may protrude between 0.1 and 0.5 millimeters from the outer wall of the shaft portion. This is a suitable size that allows the one or more ribs to grip on the inside wall of the clamping member. The one or more ribs may comprise serrations.

The first material may comprise aluminum and the second material may comprise steel such as phosphorous steel. Steel is a strong and cost-effective material that may be suitable for vehicle parts. Other materials may be suitable for other applications. In addition to being strong and cost effective, steel is a readily available material. Also, aluminum is a cost effective and readably available material. A shaft portion of the stud member made of steel and a clamping member made of aluminum are able to generate a strong gripping thereby helping to protect the assembly from pulling forces.

The fastening member may comprise a screw, the bore may extend in a first direction and the clamping member comprises an opening extending in a second direction substantially perpendicular to the first direction and configured to receive the screw. This allows the fastening member to be easily loosened or tightened.

The one or more ribs may be arranged to form a helix shape. This is a suitable arrangement for the one or more ribs that allows the one or more ribs to grip on the inside wall of the clamping member. Also improves the manufacturing process of the assembly.

The one or more ribs may protrude from the outer wall of the shaft portion forming a semicircular shape. This shape allows the rib to create a suitable gripping on the inside wall of the clamping member thereby improving the gripping function of the assembly to avoid slipping due to possible fatigue events on the assembly. The semicircular shape may be a half circle or have a softer radius.

The shaft portion may comprise a depression extending in the radial direction on the outer wall. The depression or groove and the fastening member may match providing a locking function that further prevents the shaft portion from losing grip at, for instance, very high loads.

The shaft portion may comprise one or more ribs at one side of the depression and one or more ribs at the opposite side of the depression.

The screw, when inserted in the opening of the clamping member may lie against the depression, thereby increasing grip between the clamping member and the stud member.

The stud member may comprise a ball portion formed at an end of the shaft portion. The ball portion can be attached to, for instance, a control arm. The ball portion can be attached to any other part of a vehicle.

According to another embodiment, a wheel suspension system comprising the above-described assembly is provided. Also, a vehicle comprising the assembly, or the wheel suspension system is provided. This provides a convenient wheel suspension system which includes the assembly to minimize or prevent slippage.

According to another embodiment, a method for assembling the above described assembly is provided, the method comprising inserting the shaft portion of the stud member into the bore of the clamping member, and fastening the clamping member around the shaft portion with the fastening member such that the one or more ribs deform the inside wall of the clamping member to increase grip.

According to another embodiment, a method for manufacturing the above described assembly is provided, the method comprising providing the stud member, forming the one or more ribs using a serration machine around the outer wall of the shaft portion or pressing the outer wall of the shaft portion using a cutting tool, providing the clamping member, and providing the fastening member.

The person skilled in the art will understand that the features described above may be combined in any way deemed useful.

BRIEF DESCRIPTION OF THE DRAWINGS

The present disclosure will now be described in further detail with reference to the drawings that shows embodiments of the present disclosure.

FIG. 1D-I is a partial detailed view of the ribs of the stud member of the assembly of FIG. 1A.

FIGS. 1D-II, 1D-III, 1E-I and 1E-II show ribs with different shapes.

FIG. 2A is a cross-sectional view of an assembly comprising a stud member, a clamping member and a fastening member according to at least one example of the disclosure.

FIGS. 3B-I and 3B-II are respectively a perspective and a cross sectional view of one of the assemblies of FIG. 3A.

FIGS. 3C-I and 3C-II are respectively a perspective and a cross sectional view of the other one of the assemblies of FIG. 3A.

DETAILED DESCRIPTION

Figure 1A:
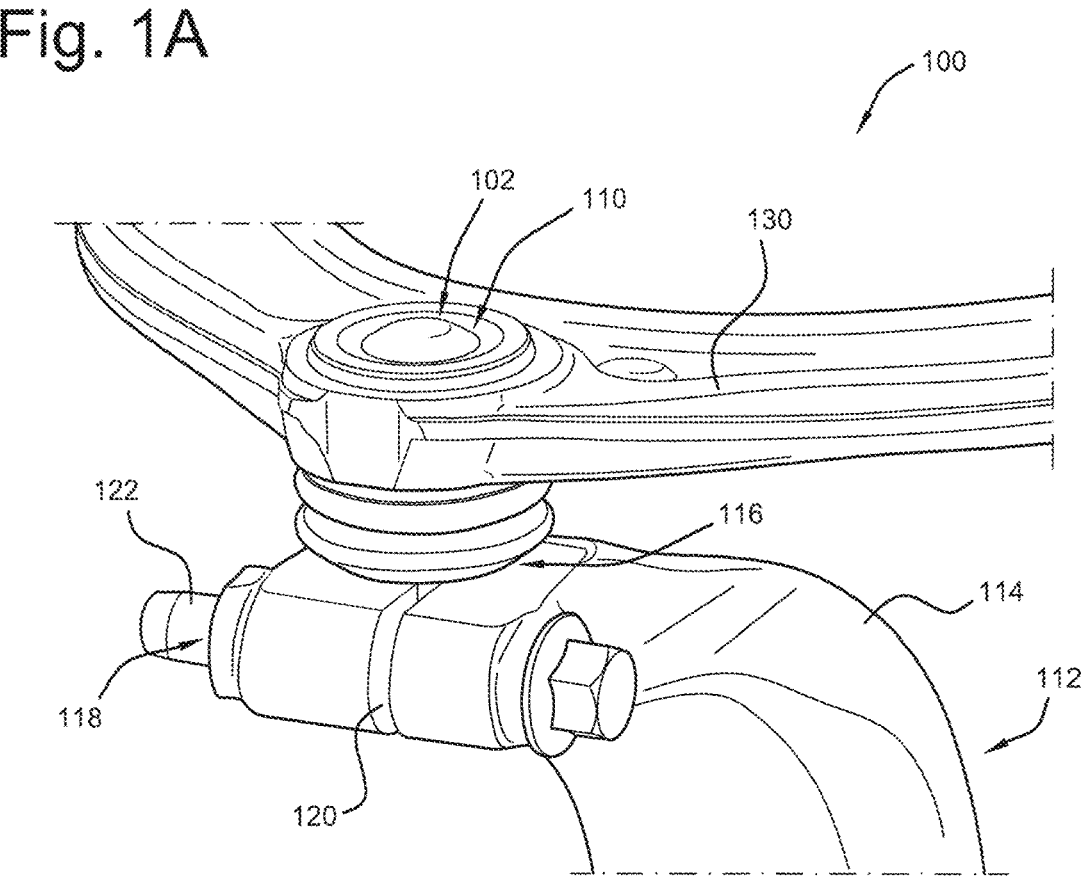
FIG. 1A is a perspective view of an assembly comprising a stud member, a clamping member and a fastening member according to at least one example of the disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "vehicle" as used herein refers to a thing used for transporting people or goods. Automobiles, cars, trucks, or buses etc. are examples of vehicles. The term "vehicle" also includes electric vehicle (EV) powered by an electric motor that draws current from an on-vehicle energy storage device, such as a battery, which is rechargeable from an off-vehicle source, such as residential or public electric service or an on-vehicle fuel powered generator. The EV may be two or more wheeled vehicles manufactured for use primarily on public streets, roads. The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

The present disclosure is directed to an assembly comprising a stud member, a clamping member and a fastening member. The assembly is arranged to support pulling forces, for instance when used in a suspension member of a vehicle. The stud member comprises a shaft portion having one or more ribs that extend in a radial direction on an outer wall of the shaft portion. The clamping member comprises a main body with a bore or opening defined by an inside wall of the clamping member and arranged to receive the shaft portion of the stud member.

The bore may comprise two open ends such that the shaft portion enters at one side of the clamping member and goes out at the opposite side of the clamping member or may only comprise one open end such that the shaft portion enters into the clamping member at that open end and rests against the bottom of the bore.

The surface of the outside wall of the shaft portion comprises one or more ribs that are configured to generate a mechanical grip between the stud member and the clamping member and can be any kind of ribs forming an angle between 45 and 90 with an axial direction of the shaft member. The one or more ribs may comprise a spiral shape. The assembly comprises further a fastening member such a screw arranged to fasten the clamping member around the shaft portion of the stud member.

Figure 1B:
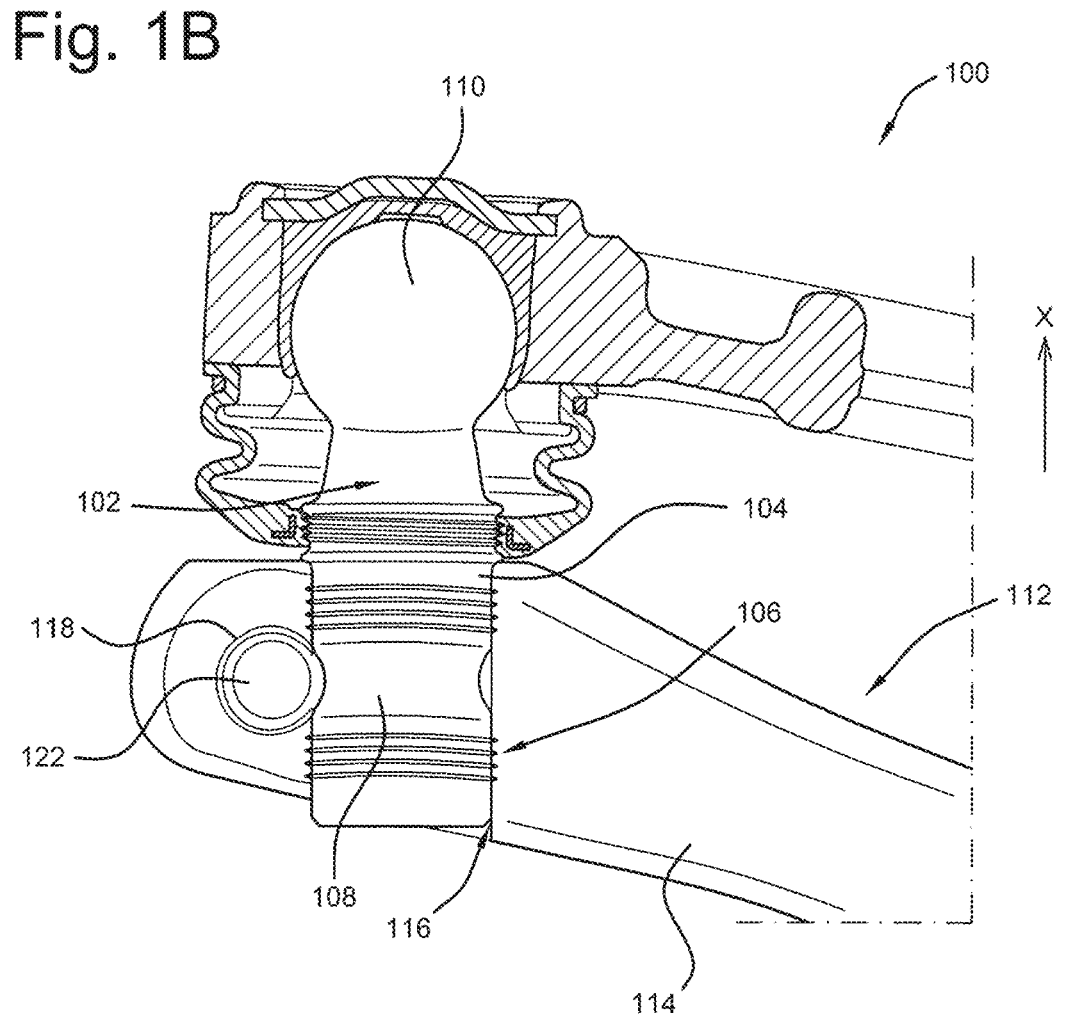
FIGS. 1B and 1C are different views of the assembly of FIG. 1A.
Figure 1C:
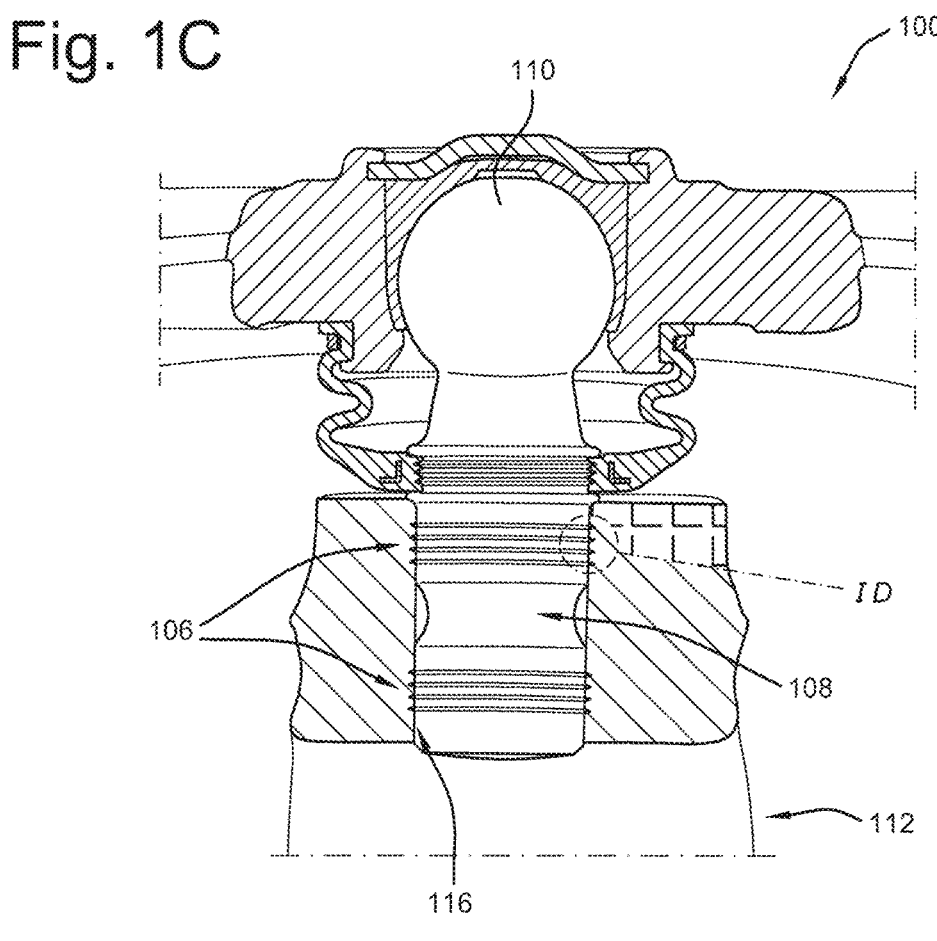
Figure 1C:
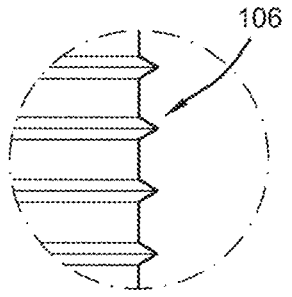
Figure 1C:
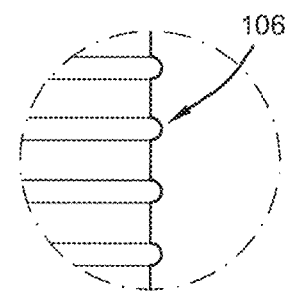
Figure 1C:
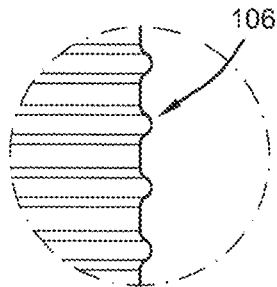

FIG. 1A is a perspective view of assembly 100. FIGS. 1B and 1C show assembly 100 with cross section views of the clamping and fastening member and 3D view of the stud member for explanation purposes. FIG. 1D-I is a detailed view of assembly 100. Assembly 100 includes stud member 102, clamping member 112 and fastening member 122. The stud member 102 includes a shaft portion 104 and a ball portion 110.

The shaft portion 104 has eight ribs 106 extending in a radial direction on an outer wall of the shaft portion 104. The shaft portion 104 is cylindrical and extends in an axial direction X. The ribs 106 extend around the shaft portion 104 in a radial direction that is substantially perpendicular to the axial direction X.

The clamping member 112 includes a main body 114. The main body 114 is hollow and includes bore or cavity 116 formed by an inside wall and arranged to receive the shaft portion 104. The bore or cavity 116 extends and traverses the main body 114 from one side to the opposite side. The inside wall of the bore 116 defines a cylindrical space extending parallel to the axial direction X such that the shaft portion 104 can be introduced inside of the bore 116. The bore or cavity 116 may be sized and configured to fit around the shaft portion 104 of the stud member.

The clamping member 112 includes further an opening 118 that extends substantially perpendicular to the axial direction X. The opening 118 is connected to the bore 116.

The assembly 100 comprises a screw 122 as a fastening member. After introducing the shaft portion 104 inside of the bore 116, the screw 122 is introduced inside of the opening 118 to tight the clamping member 112 around the shaft portion 104. The clamping member 112 comprises further a slit 120 formed on the inside wall of the bore 116 and extending through and connecting to the opening 118. In this way, the slit 120 enables the clamping member 112 to be fasten around the shaft portion 104 by tighten the screw 122 when inside of the opening 118.

The shaft portion 104 includes a depression 108 which extends on the outer wall of the shaft portion 104 surrounding it. The shaft portion 104 comprises further eight ribs 106 wherein four ribs are located at one side of the depression 108 and four ribs at the opposite side of the depression 108. The screw 122 enters into the opening 118 of the clamping member 112 which is connected to the bore 116 such that the screw 122 rests against the depression 108 thereby providing a locking function.

The stud member 102 comprises ball portion 110 formed at an end of the shaft portion 104. The ball portion enables attachment of the assembly to, for instance a control arm 130 that may be used for a wheel suspension system that needs to be able to handle high loads.

The control arm 130 is attached to the ball portion 110 such that is able to rotate with respect to the assembly 100 when the shaft portion 104 is installed inside the bore 116 and the clamping member 112 is fasten around the shaft portion 104 by tighten the screw 122 when inside of the opening 118.

The main body 114 of the clamping member 112 is made of aluminum, and the shaft portion 104 of the stud member 102 is made of steel. However, any other materials may be used as far as the clamping member, or at least the part of the clamping member forming the inside wall of the bore, is made of a softer material than the shaft portion such that the ribs are able to grip on the inside wall of the bore.

As shown in FIG. 1D-I, the ribs 106 protrude between 0.1 and 0.5 millimeters from the outer wall of the shaft portion 104 and are formed as serrations. The ribs 106 shown in FIG. 1D-I protrude from the outer wall with a triangular shape. However, any other suitable shape could be used such as semicircular shape as in FIG. 1D-II or a soft radius semicircular shape as shown in FIG. 1D-III.

The ribs 106 are arranged in parallel extending around the whole circumference of the shaft portion. However, any other suitable configuration, such a helix shape as shown in FIG. 1E-I, could be used. Also, the ribs may extend over the whole circumference of the outside wall of the shaft portion or just over a part. For instance, the ribs may extend only over half circumference of the outside wall. The ribs may be continuous or discontinuous as shown in FIG. 1E-Il.

Typically, stud member 102 would be integrally formed, for example, from cutting, stamping, machining, molding, pressing, printing, or any other suitable method. Forming the ribs 106 could be done by knurling, etching, pressing or any other suitable method. For instance, the ribs may be formed using a serration machine around the outer wall of the shaft portion 104 or pressing the outer wall of the shaft portion 104 using a cutting tool.

In some embodiments, the ball portion and the shaft portion could be formed separately and then joined together.

The shaft portion of the stud member will then be introduced into the bore 116 of the clamping member 112. The screw 118 will be inserted into the opening 118 to fast the clamping member 112 around the shaft portion 104. The ribs 106 of the shaft portion will then grip against the inside wall of the clamping member 112.

FIG. 2A is a cross-sectional view of assembly 200. Assembly 200 is similar to assembly 100 without the locking function provided by depression 108 matching screw 122. Assembly 200 includes stud member 202, clamping member 212 and fastening member 222.

The stud member 202 includes a shaft portion 204 that has six ribs 106 extending in a radial direction on an outer wall of the shaft portion. The shaft portion is cylindrical and extends in an axial direction X. The ribs 106 extend around the shaft portion 204 in a radial direction that is substantially perpendicular to the axial direction X. The ribs may have any suitable shape and configuration such as, for instance, the ones described with respect to FIGS. 1D-I, 1D-II, 1D-III, 1E-I and 1E-II.

The clamping member 212 includes a main body 214. The main body 214 is hollow thereby having bore or cavity 216 formed by an inside wall and arranged to receive the shaft portion 204. The bore or cavity 216 extends and traverses the main body 214 from one side to the opposite side. The inside wall of the bore 216 defines a cylindrical space extending parallel to the axial direction X such that the shaft portion 204 can be introduced inside of the bore 216. The bore or cavity 216 may be sized and configured to fit around the shaft portion 204 of the stud member.

The clamping member 212 includes further an opening 218 that extends substantially perpendicular to the axial direction X. The assembly 200 comprises a screw 222 as a fastening member. After introducing the shaft portion 204 inside of the bore 216, the screw 222 is introduced inside of the opening 218 to tight the clamping member 212 around the shaft portion 204.

Contrary to assembly 100, the opening 218 in assembly 200 is not connected to the bore 116 and the shaft portion 204 does not comprise a depression. In this way, the screw 222 does not rest against the shaft portion 204 in assembly 200.

Similar to assembly 100, the main body 214 of the clamping member 212 may be made of aluminum, and the shaft portion 204 of the stud member 202 may be made of steel, but any other materials may be used as far as the clamping member, or at least the part of the clamping member is made of a softer material than the shaft portion. Also, the methods described to assemble and manufacture assembly 100 can be applied to assemble and manufacture assembly 200.

Figures 2B, 3A:
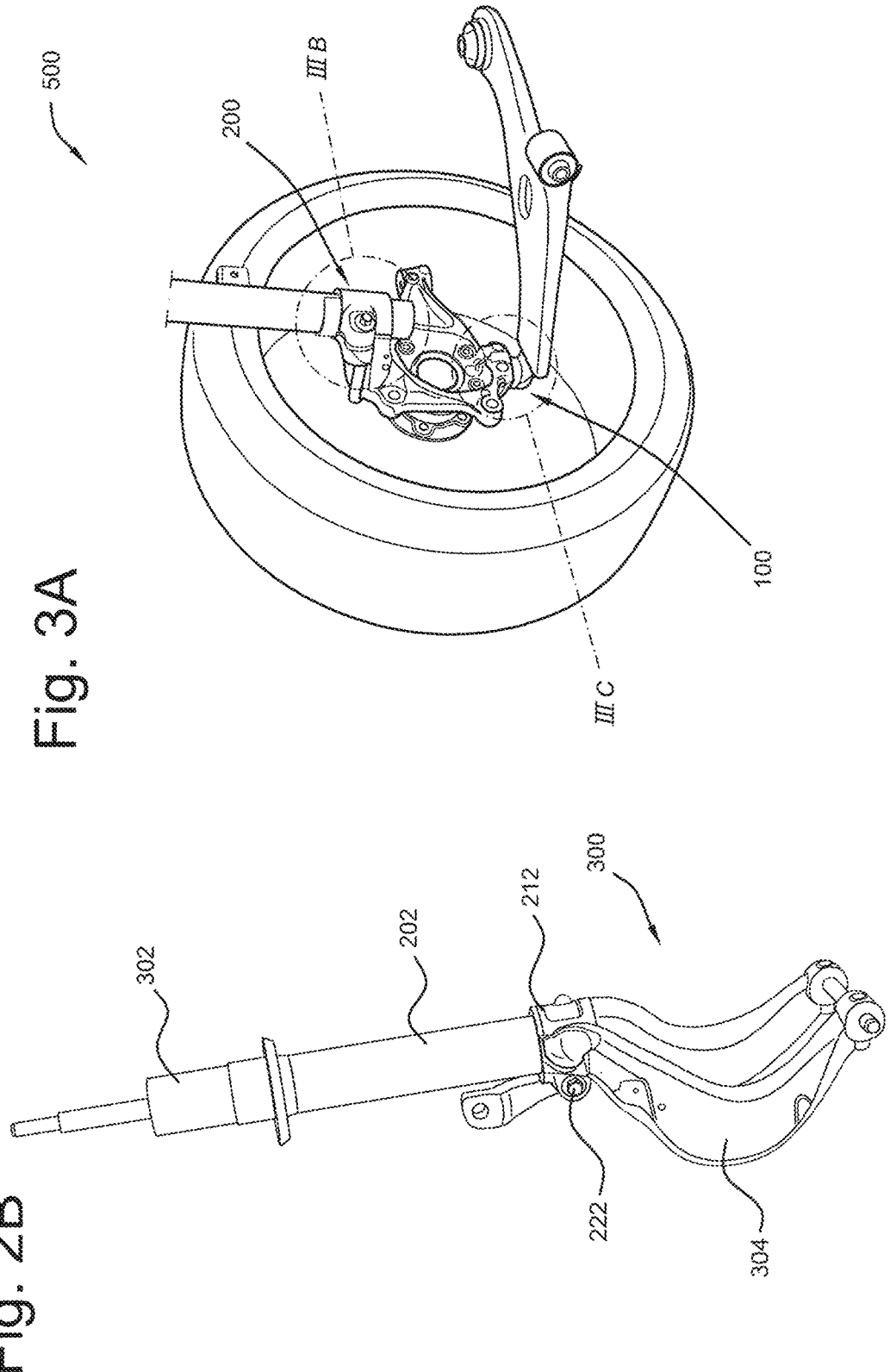
FIG. 2B is a perspective view of a damper leg and a fork connected with an assembly according to at least one example of the disclosure.
FIG. 3A is a perspective view of a wheel with assemblies according to examples of the disclosure.

FIG. 2B is a perspective view of a damper leg 300 comprising damper 302 and fork 304 connected with assembly 200. As shown in FIG. 2B, the damper 302 is connected to the stud member 202 which is inserted into the clamping member 212. The clamping member 212 is connected to the fork 304 and screw 222 fastens the clamping member 212 around the stud member 202 such that ribs 106 grip the inside wall of the bore 216. This increases the grip and assists the assembly 200 to support pulling forces causes by the damper 302.

FIG. 3A is a perspective view of a wheel 500 comprising assembly 100 and assembly 200 for supporting pulling forces of a suspension member of a vehicle. FIGS. 3B-I and 3B-II are respectively a perspective and a cross sectional view of assembly 200 of FIG. 3A without a locking function when mounted on a wheel 500, and FIGS. 3C-I and 3C-II are respectively a perspective and a cross sectional view of assembly 100 of FIG. 3A with a locking function when also mounted on a wheel 500.

In FIGS. 3A-3C-II, same reference numbers as in FIGS. 1A-1E-II and 2A have been used to indicate similar elements. Also, the detailed description of elements and alternatives provided in relation to FIGS. 1A-1E-II and 2A apply to those similar elements in FIGS. 3A-3C-II and will not be repeated here.

While the present disclosure has been described with reference to exemplary embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiments disclosed, but that the present disclosure will include all embodiments falling within the scope of the appended claims.

The invention claimed is:

1. An assembly for supporting pulling forces of a suspension member of a vehicle, the assembly comprising:
   a stud member comprising a shaft portion having one or more ribs extending in a radial direction on an outer wall of the shaft portion;
   a clamping member comprising a main body with a bore defined by an inside wall and arranged to receive the shaft portion; and
   a fastening member arranged to fasten the clamping member around the shaft portion when the shaft portion is inside the bore;
   wherein the main body of the clamping member is made of a first material, and the shaft portion of the stud member is made of a second material;
   wherein the first material is softer than the second material;
   wherein the bore extends in a first direction and the clamping member comprises an opening extending in a second direction substantially perpendicular to the first direction and configured to receive the fastening member;
   wherein the shaft portion comprises a depression extending in the radial direction on the outer wall; and
   wherein the shaft portion comprises one or more ribs at one side of the depression and one or more ribs at the opposite side of the depression.

2. The assembly according to claim 1, wherein the radial direction forms an angle between 90 and 45 degrees with an axial direction of the shaft portion and wherein, when the clamping member is fastened around the shaft portion, the one or more ribs deform an inside wall of the clamping member to increase grip.

3. The assembly according to claim 1, wherein the one or more ribs protrude between 0.1 and 0.5 millimeters from the outer wall of the shaft portion.

4. The assembly according to claim 1, wherein the first material comprises aluminum and the second material comprises steel.

5. The assembly according to claim 1, wherein the fastening member comprises a screw, the opening of the clamping member configured to receive the screw.

6. The assembly according to claim 1, wherein the one or more ribs are arranged to form a helix shape.

7. The assembly according to claim 1, wherein the one or more ribs protrude from the outer wall of the shaft portion forming a semicircular shape.

8. The assembly according to claim 5, wherein the screw, when inserted in the opening of the clamping member, lies against the depression.

9. The assembly according to claim 1, wherein the stud member comprises a ball portion formed at an end of the shaft portion.

10. A wheel suspension system comprising the assembly according to claim 1.

11. A vehicle comprising the assembly according to claim 1.

12. A method for assembling the assembly according to claim 1, the method comprising:
   inserting the shaft portion of the stud member into the bore of the clamping member; and
   fastening the clamping member around the shaft portion with the fastening member such that the one or more ribs deform the inside wall of the clamping member to increase grip.

13. A method for manufacturing the assembly according to claim 1, the method comprising:
   providing the stud member;
   forming the one or more ribs using a serration machine around the outer wall of the shaft portion or pressing the outer wall of the shaft portion using a cutting tool;
   providing the clamping member; and
   providing the fastening member.

* * * * *